(12) United States Patent
Zohar et al.

(10) Patent No.: US 11,508,087 B2
(45) Date of Patent: Nov. 22, 2022

(54) TEXTURE-BASED POSE VALIDATION

(71) Applicant: Snap Inc., Santa Monica, CA (US)

(72) Inventors: Matan Zohar, Rishon LeZion (IL); Avihay Assouline, Tel Aviv (IL); Gal Dudovitch, Tel Aviv (IL); Itamar Berger, Hod Hasharon (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/929,333

(22) Filed: Apr. 27, 2020

(65) Prior Publication Data
US 2021/0335004 A1 Oct. 28, 2021

(51) Int. Cl.
*G06T 7/73* (2017.01)
*G06T 3/40* (2006.01)
*G06T 11/60* (2006.01)

(52) U.S. Cl.
CPC ............... *G06T 7/74* (2017.01); *G06T 3/40* (2013.01); *G06T 11/60* (2013.01); *G06T 2207/10016* (2013.01); *G06T 2207/30196* (2013.01)

(58) Field of Classification Search
CPC ...................................................... G06T 7/74
USPC ........................................................ 345/634
See application file for complete search history.

(56) References Cited

U.S. PATENT DOCUMENTS

| | | | | |
|---|---|---|---|---|
| 2012/0309520 A1* | 12/2012 | Evertt | ............... | A63F 13/213 463/31 |
| 2014/0219550 A1* | 8/2014 | Popa | ............... | G06V 20/42 382/154 |
| 2015/0042663 A1* | 2/2015 | Mandel | ............... | G06T 13/80 345/474 |
| 2015/0325004 A1* | 11/2015 | Utsunomiya | ............... | G06V 40/25 382/103 |
| 2015/0371447 A1* | 12/2015 | Yasutake | ............... | G06T 19/006 345/633 |
| 2017/0278288 A1* | 9/2017 | Suzuki | ............... | G06T 11/60 345/634 |
| 2020/0090408 A1* | 3/2020 | Virkar | ............... | G06T 7/215 |

OTHER PUBLICATIONS

"Visual Feedback for Core Training with 3D Human Shape and Pose" Haoran Xie et al., 2019 Nicograph International, IEEE.*
"International Application Serial No. PCT/US2021/029169, International Search Report dated Aug. 6, 2021", 5 pgs.

(Continued)

*Primary Examiner* — Javid A Amini
(74) *Attorney, Agent, or Firm* — Schwegman Lundberg & Woessner, P.A.

(57) ABSTRACT

Aspects of the present disclosure involve a system comprising a computer-readable storage medium storing a program and a method for detecting a pose of a user. The program and method include operations comprising: receiving a monocular image that includes a depiction of a body of a user in a given pose; detecting a plurality of skeletal joints of the body depicted in the monocular image; generating an outline of the body of the user based on the plurality of skeletal joints; retrieving a mask that represents a target pose; comparing the outline of the body depicted in the monocular image with the mask that represents the target pose; and determining that the given pose of the body of the user matches the target pose in response to comparing the outline of the body with the mask.

20 Claims, 11 Drawing Sheets

(56) References Cited

OTHER PUBLICATIONS

"International Application Serial No. PCT/US2021/029169, Written Opinion dated Aug. 6, 2021", 8 pgs.

Atrevi, Fabrice Dieudonne, et al., "3D Human Poses Estimation from a Single 2D Silhouette", Proceedings of the 11th Joint Conference On Computer Vision, Imaging and Computer Graphics Theory and Applications, (2016), 361-369.

Bogo, Federica, et al., "Keep It SMPL: Automatic Estimation of 3D Human Pose and Shape from a Single Image", International Conference On Financial Cryptography And Data Security; [Lecture Notes In Computer Science; Lect.Notes Computer]. Springer. Berlin. Heidelberg, (2016), 561-578.

Xie, Haoran, et al., "Visual Feedback for Core Training with 3D Human Shape and Pose", 2019 Nicograph International (NICOINT), IEEE, (Jul. 5, 2019), 49-56.

\* cited by examiner

TEXTURE-BASED POSE VALIDATION

TECHNICAL FIELD

The present disclosure relates generally to detecting a pose of a user based on an image depicting the user.

BACKGROUND

Image processing systems can be used to react to different actions users perform that are captured by a camera. Such systems can modify presentation of virtual objects or perform other application specific functions. Such systems can be subject to presentation problems due to environmental conditions, user actions, unanticipated visual interruption between a camera and the object being rendered, and the like. The presentation problems also arise due to failure to accurately detect user actions. This can cause a virtual object to disappear or otherwise behave erratically, or incorrect functions to be executed, which breaks the illusion of the virtual objects being present in the real world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
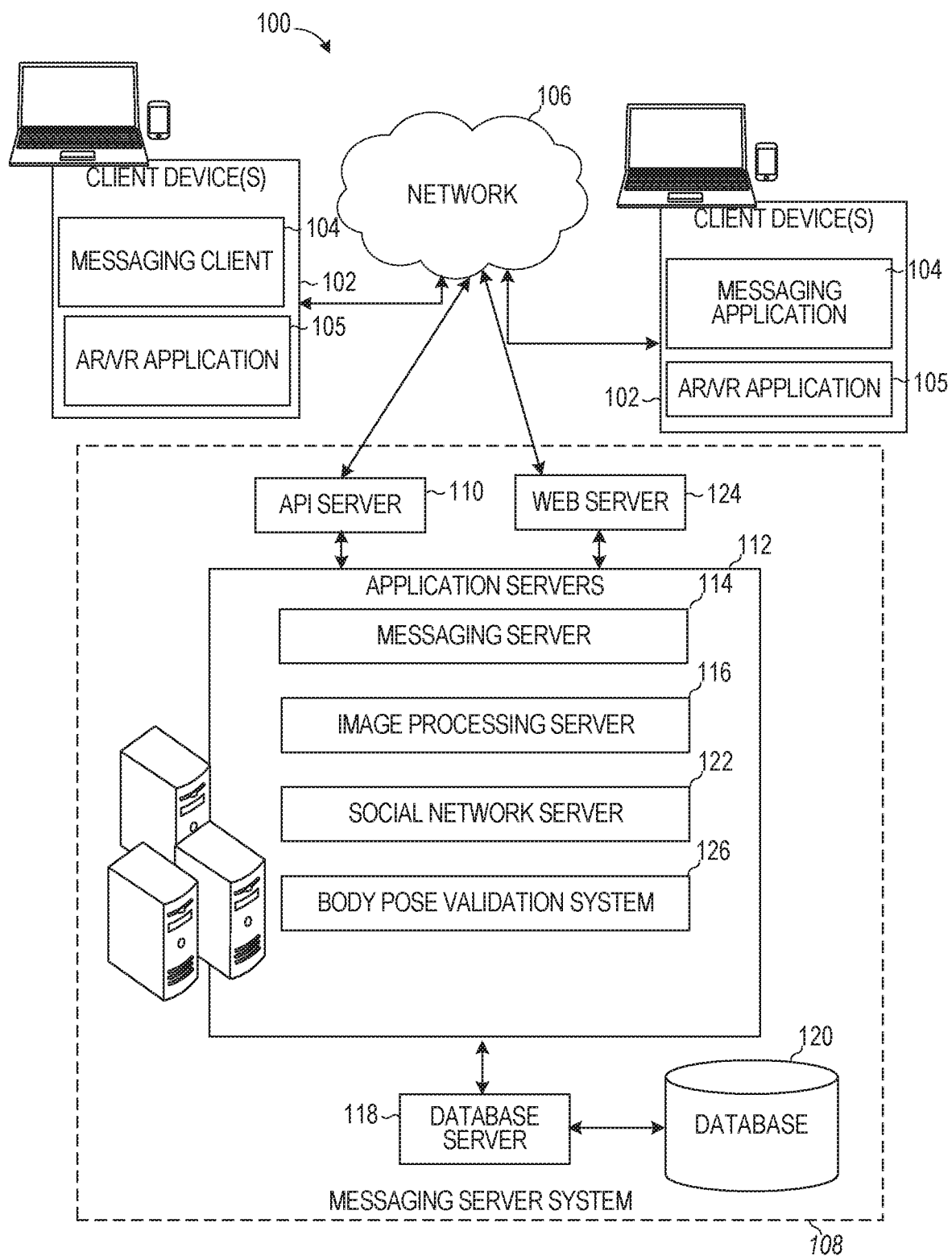
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, virtual reality (VR) and augmented reality (AR) systems display avatars representing a given user by capturing an image of the user and, in addition, obtaining a depth map using a depth sensor of the real-world human body depicted in the image. By processing the depth map and the image together, the VR and AR systems can detect and mimic or react to actions performed by the user. While such systems work well for presenting avatars of a user and reacting to actions performed by the user, such as modifying virtual objects or performing application functions, the need for a depth sensor limits the scope of their applications. This is because adding depth sensors to user devices for the purpose of displaying avatars or performing actions in response to user-detected poses increases the overall cost and complexity of the devices, making them less attractive.

Certain systems attempt to detect user actions, such as poses, that are received in an image based on joint positions of the body of the user depicted in the image. Such systems rely on predetermined angles of various joint positions to be specified. These systems compute angles of the joint positions detected in an image in real-time for comparison with the predetermined angles in order to detect a given pose. Inputting such angles requires a certain level of skill and consumes a great deal of time, especially when a large subset of poses are being tracked. This reduces the scalability of the systems and increases the overall amount of resources such systems consume.

Other systems attempt to detect user actions by applying a previously trained neural network that segments one or more images to detect a given pose. Such neural networks take a great deal of time and resources to train to accurately predict a given pose. These systems also require the input image to have a specific position, orientation, and scale in order to accurately detect a pose in the input image. This reduces the scalability of the systems and increases the overall amount of resources such systems consume and even still fails to always work effectively to detect user poses.

The disclosed embodiments improve the efficiency of using the electronic device by identifying skeletal joints of a user's body from one or more images of the user and generating an outline of the user's body to compare against a mask associated with a target pose. If the outline of the body matches the target pose associated with the mask, the pose of the user's body is validated as matching the target pose. In response, a given set of application actions can be executed or virtual objects can be rendered in an AR/VR environment. Specifically, a monocular image that includes a depiction of a body of a user in a given pose is received and a plurality of skeletal joints of the body depicted in the monocular image are detected. Such skeletal joints can be detected using one or more previously trained machine learning techniques or using any other suitable operation. An outline of the body of the user is generated based on the plurality of skeletal joints and a mask that represents a target pose is retrieved. The mask may be retrieved based on a target function, such as counting jumping jacks, of an application or based on a virtual object that is to be modified. The outline of the body depicted in the monocular image is compared with the mask that represents the target pose and, in response, the given pose of the body of the user is determined to match the target pose. "Outline" as used herein refers to an outer line of the object or a silhouette (e.g., a block representation of the object).

By using a mask image to determine a pose of the user (or other object), complex angles between different joint positions do not need to be previously input and computed. This increases the ease at which different target poses can be input and created and reduces the overall consumption of resources in detecting a pose, at least because different angles need not be computed in real-time to detect a target pose. Also, by aligning the mask to the center of the body detected in an input image, according to the disclosed embodiments, the scalability of the system is increased and enables the system to dynamically and continuously adjust to a position of the user in the image that is input as the user moves left/right or towards/away from the camera. This makes the disclosed embodiments less sensitive to the specific position, orientation and scale of the user's body in the input image in validating a given pose performed by the user.

Virtual objects (e.g., a three-dimensional object, such as a 3D caption, emoji, character, avatar, animation, looping animation of a personalized avatar or character, looping or non-looping animated graphic such as a dancing hot dog, a stylized word with animation, and so forth) can be generated directly from a single red, green, and blue (RGB) image (e.g., a monocular RGB image) or a video of RGB images depicting the real-world user's body in response to the target pose being detected. The disclosed embodiments generate the virtual object without also obtaining a depth map of the real-world user's body. This enables a user device with a simple RGB camera (without a depth sensor) to accurately and quickly render an animated virtual object based on the real-world user's body pose within the VR or AR application, allowing the user to interact with the VR or AR content in a more realistic environment.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and an AR/VR application 105. Each messaging client 104 and AR/VR application 105 is communicatively coupled to other instances of the messaging client 104 and AR/VR application 105 and a messaging server system 108 via a network 106 (e.g., the Internet).

A messaging client 104 and AR/VR application 105 are able to communicate and exchange data with another messaging client 104 and AR/VR application 105 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

AR/VR application 105 is an application that includes a set of functions that allow the client device 102 to access body pose validation system 126. In some implementations, the AR/VR application 105 is a component or a feature that is part of the messaging client 104. AR/VR application 105 uses an RGB camera to capture one or more monocular images (e.g., a video) of a user's real-world body. The AR/VR application 105 applies one or more trained machine learning techniques on the captured images of the body to detect skeletal joint positions of the body. The AR/VR application 105 generates an outline of the user's body, such as by drawing a line that connects the different skeletal joint positions that are detected. The AR/R application 105 obtains one or more masks from a storage device that each depicts a different target pose, such as to perform a given set of application functions. For example, if the AR/VR application 105 includes a function to count jumping jacks performed by the user, the AR/VR application 105 retrieves a first mask that depicts a first target pose and a second mask that depicts a second target pose. Whenever the AR/VR application 105 determines that the outline of the user matches the first target pose followed by the second target pose of the first and second masks, the AR/VR application 105 increments a number representing the total number of detected jumping jacks.

For example, when the user's hands are raised above the head and are subsequently lowered, the AR/VR application 105 determines that a single jumping jack has been completed and automatically increments a running total by one. In some cases, the AR/VR application 105 compares a first outline of the body depicted in a first image in the captured images to the first mask. When the outline substantially overlaps the target pose depicted in the mask (e.g., when more than a threshold number of pixels of the outline overlap pixels of the target pose depicted in the mask), the AR/VR application 105 determines that the pose depicted in the first image matches the first mask. The AR/VR application 105 then analyzes a second image subsequently received after the first image to generate a second outline. The AR/VR application 105 retrieves the second mask and compares the second outline to the second mask. When the second outline substantially overlaps the target pose depicted in the second mask (e.g., when more than a threshold number of pixels of the outline overlap pixels of the target pose depicted in the mask), the AR/VR application 105 determines that the pose depicted in the second image matches the second mask. Once the AR/VR application 105 determines that the second pose was validated sequentially after the first pose, the AR/VR application 105 executes an application function, such as incrementing a number representing a total number of jumping jacks performed by the user. Other functions may include firing a virtual weapon in a video game or modifying one or more avatars in a certain manner in response to the determining that first and second poses were being performed in sequence by the user.

In some embodiments, the AR/VR application 105 detects joint positions of a body depicted in a captured RGB image directly from the captured RGB image by obtaining a first trained machine learning technique from local or remote storage. The first trained machine learning technique processes the captured RGB image to extract one or more features from the RGB image that correspond to the body depicted in the captured RGB image. The features are analyzed to identify one or more skeletal joints and their respective alignment relative to one another. Specifically, the features are analyzed to determine the joint positions of a specified set of skeletal joints. The AR/VR application 105 also obtains a second trained machine learning technique to process one or more previously captured frames (e.g., 1-2 seconds of video frames that immediately precede the RGB image) to estimate or predict skeletal joint positions for a subsequent frame. A threshold number of seconds of video frames (which may be user defined, previously specified, and/or dynamically determined) may continuously or periodically be stored in a buffer, such that the threshold number of seconds worth of video frames that precedes a current RGB image can be accessed by the second trained machine learning technique. The output or prediction of the skeletal joint positions of the second trained machine learning technique is used to filter or improve the skeletal joint positions identified by the first trained machine learning technique. In some cases, the second trained machine learning technique processes the skeletal joint positions identified by the first trained machine learning technique together with the previously captured frames to filter or improve the estimated skeletal joint positions. Techniques for detecting skeletal joint positions are described in greater detail in commonly-owned Assouline et al. U.S. patent application Ser. No. 16/710,980, filed Dec. 11, 2019, which is hereby incorporated by reference in its entirety.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112, including body pose validation system 126. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, body pose validation system 126, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
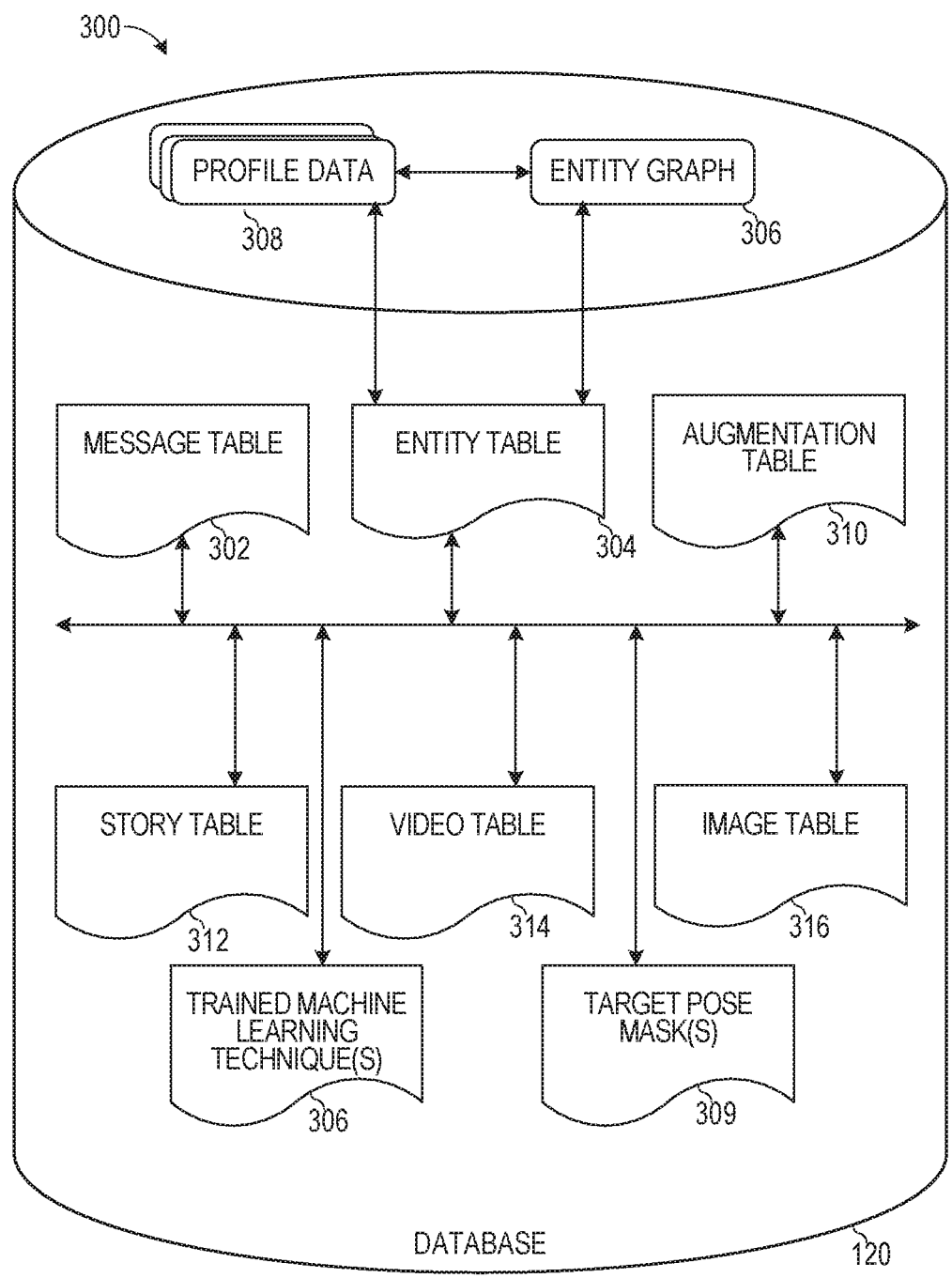
FIG. 3 is a schematic diagram illustrating data which may be stored in the database of a messaging server system, according to example embodiments.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
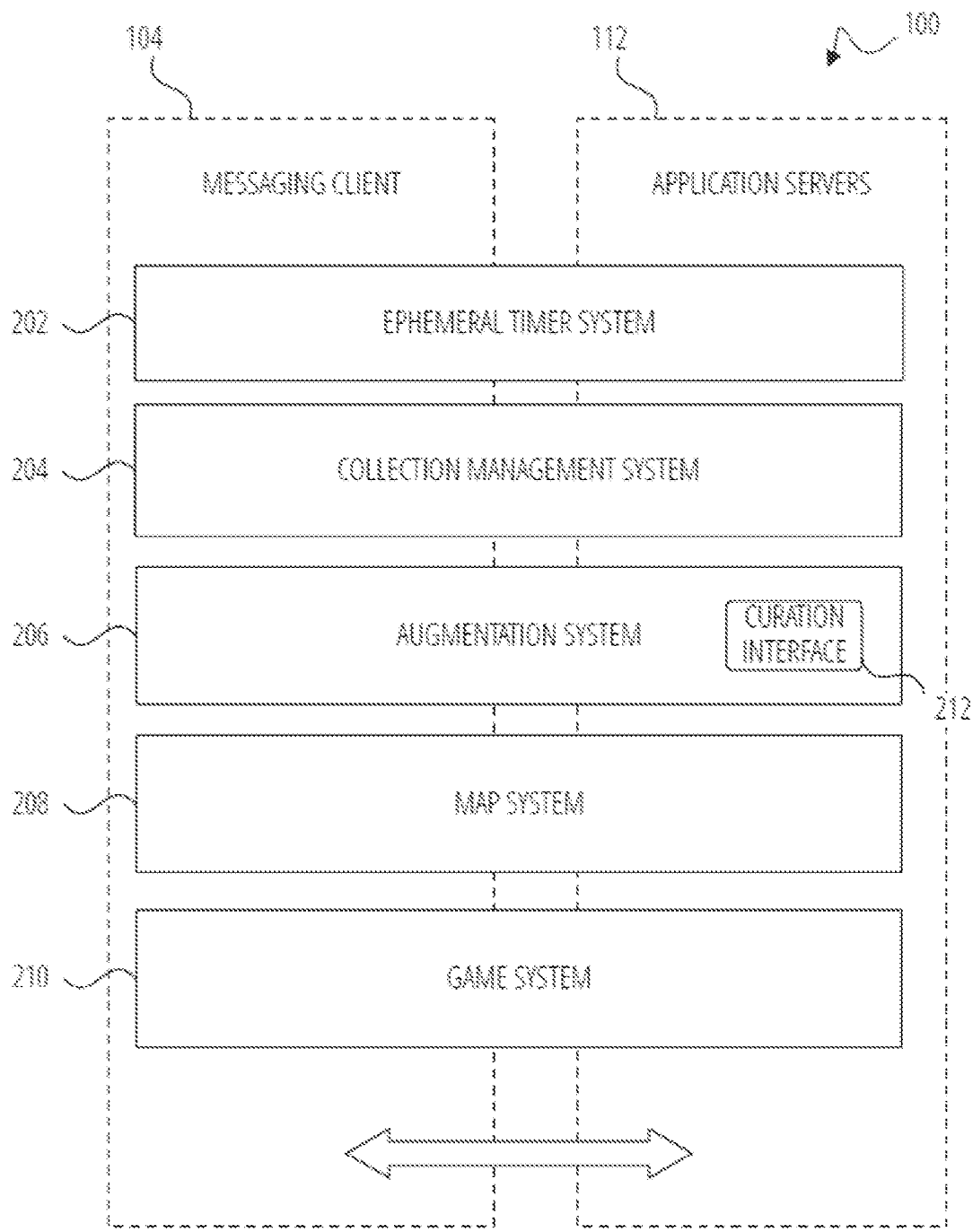
FIG. 2 is a block diagram illustrating further details regarding the messaging system of FIG. 1, according to example embodiments.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210. In some implementations, augmentation system 206 implements some or all of the functionality of the body pose validation system 126.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice Beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interest-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying lenses or augmented reality experiences). An augmented reality content item may be a real-time special effect and sound that may be added to an image or a video.

Trained machine learning technique(s) 306 stores parameters that have been trained during training of the body pose validation system 126. For example, trained machine learning techniques 306 stores the trained parameters of one or more neural network machine learning techniques.

Target pose mask(s) 309 stores masks that represent different target poses. Each target pose mask or combination or sequence of target pose masks may be associated with a different AR/VR application function. Each target pose mask includes a black and white depiction of a target pose. For example, the mask may depict a target pose using white pixels on a black background. Any other suitable mask arrangement or color can be utilized in the mask to represent a target pose, such as black pixels representing a target pose on a white background. The masks can be user defined or drawn using any suitable drawing tool and stored in target pose mask(s) 309. The mask may depict the full body of a user (e.g., arms, head, neck, torso, and legs) or only a portion of the body that is the subject of a target pose (e.g., only the head, neck, shoulders and arms). Each mask may be associated with a pixel count or pixel threshold that specifies how much of the mask has to overlap an outline of a user depicted in an input image for the target pose to be validated. The threshold may also be defined as a more complex mathematical function for matching and un-matching mask pixels. For example, a first mask may be associated with an 80 percent threshold and a second mask may be associated with a 95 percent threshold. In such cases, when pixels corresponding to the outline of the body of the user overlap 80 percent of the pixels that depict the target pose in the first mask, the first target pose is validated or detected. As another example, when pixels corresponding to the outline of the body of the user overlap less than 95 percent of the pixels that depict the target pose in the second mask, the second target pose is not validated or not detected. In some cases, a default threshold may be applied to all of the masks that are stored in target pose mask(s) 309. The mask may also depict any non-human object (e.g., dogs, cats, animals or other objects). Namely, the disclosed embodiments apply to detecting target poses of users and to detecting target poses of other objects.

In certain embodiments, a first threshold may be associated with a first portion of a first mask (e.g., the head region of the first pose may be associated with a 50 percent threshold) and a second threshold may be associated with a second portion of the first mask (e.g., the arms region of the first pose may be associated with an 85 percent threshold). In such cases, when the head region pixels of the outline of the body of the user depicted in the image region overlap at least 50 percent of the head region of the first mask, and when the arms region pixels of the outline overlap more than 85 percent of the arms region of the first mask, the first target pose is validated or detected. When the head region pixels of the outline of the body of the user depicted in the image region overlap at least 50 percent of the head region of the first mask, and when the arms region pixels of the outline overlap less than 85 percent of the arms region of the first mask, the first target pose is not validated or not detected.

A first mask that is stored in the target pose mask(s) 309 may be associated with a second mask. For example, the first mask may be positioned first in a target pose sequence and the second mask may be positioned second in the target pose sequence. In such cases, an application function is executed when the second target pose is detected sequentially after the first target pose is detected. If the second target pose is detected first followed by the first target pose, the application function is not executed and the system continues to monitor for the sequence of target poses. In some cases, any combination of poses that are detected in the input image that match all of the poses in the sequence regardless of the sequence at which the poses are detected can result in the application function being executed. For example, detection of the second pose followed by the first pose of the target pose sequence can result in the application function being executed. In some embodiments, a first application function is executed when the sequence of target poses is detected (e.g., the first target pose is detected in an input image followed by the second target pose) and a second application function is executed when the target poses are detected out of the sequence (e.g., the second target pose is detected in the input image before the first target pose).

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
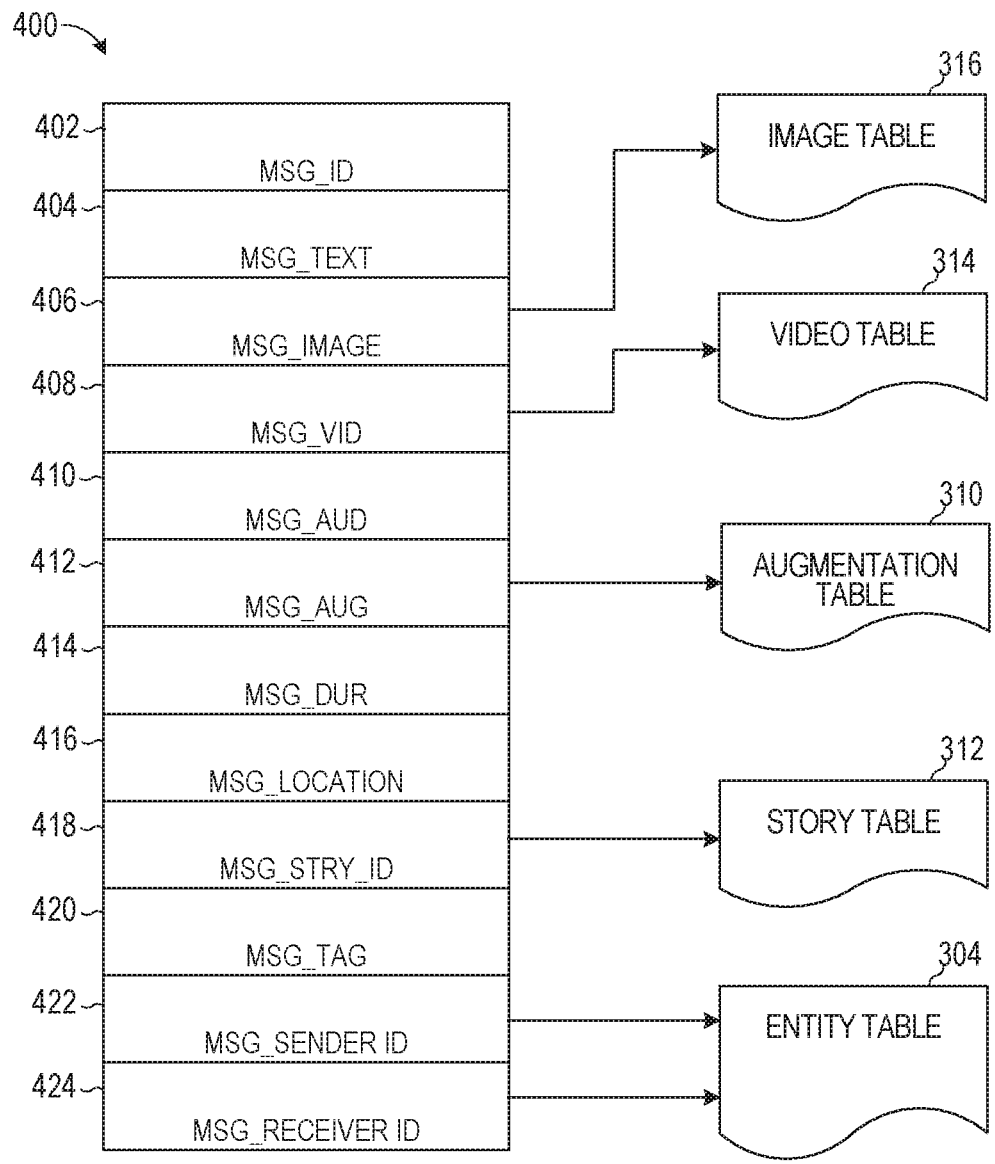
FIG. 4 is a schematic diagram illustrating a structure of a message generated by a messaging client application for communication, according to example embodiments.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5A:
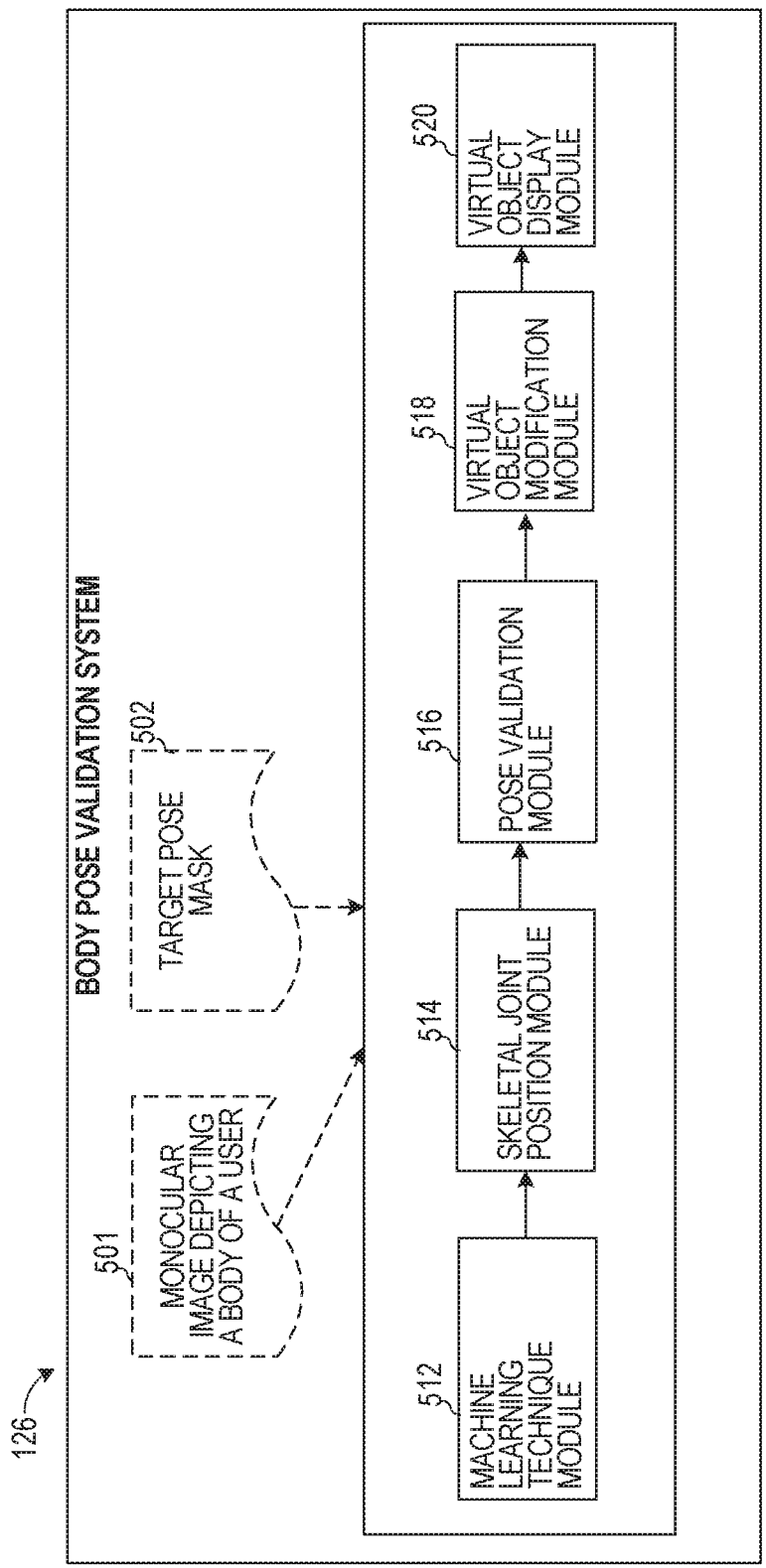
FIG. 5A is a block diagram showing an example body pose validation system, according to example embodiments.

FIG. 5A is a block diagram showing an example body pose validation system 126, according to example embodiments. Body pose validation system 126 operates on a set of input data (e.g., a monocular image 501 depicting a real body of a user and a target pose mask 502). A first portion of the set of input data is obtained from database(s) 120 and a second portion of the set of input data is obtained from an RGB camera of a client device 102 when an AR/VR application 105 is being used. Body pose validation system 126 includes a machine learning technique module 512, a skeletal joint position module 514, a pose validation module 516, a virtual object modification module 518, and a virtual object display module 520.

In some embodiments, the body pose validation system 126 includes a user detection component (not shown). The user detection component is activated in response to receiving input from the user that activates the front or rear facing camera of a client device 102. Once activated, the user detection component analyzes features of a set of images captured by the camera of the client device. The user detection component determines whether the features match an object that corresponds to a human or person. In such cases, the user detection component initiates the process for determining whether a pose of the user depicted in the images matches a target pose. Specifically, the user detection component instructs the machine learning technique module 512, skeletal joint position module 514 and the pose validation module 516 to compare the pose of the user detected in the image(s) with one or more masks that depicted respective poses. In some cases, the user detection component is part of the machine learning technique module 512.

Figure 5B:
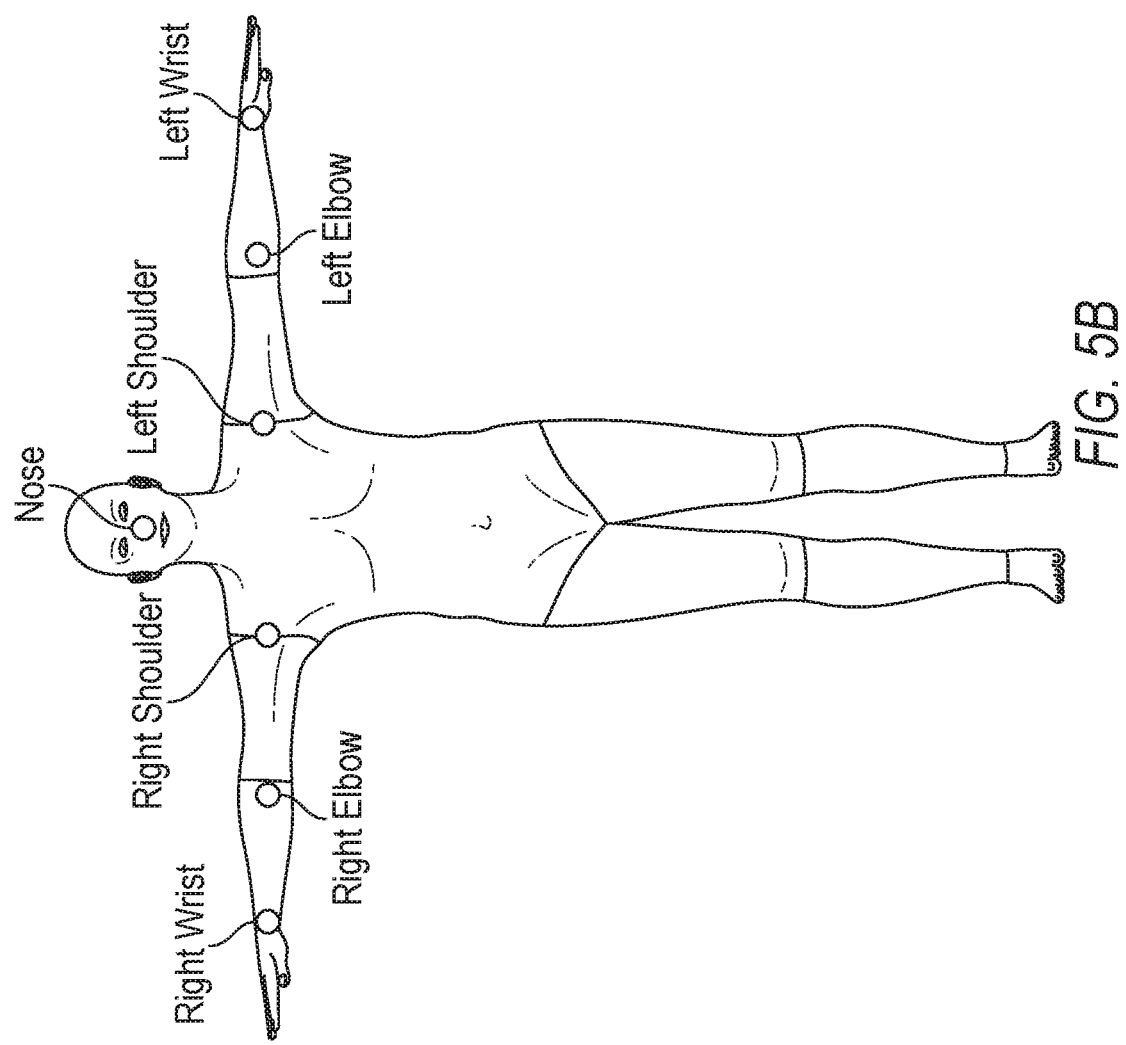
FIG. 5B is a diagram showing body joint positions used to determine a body pose, according to example embodiments.

The machine learning technique module 512 extracts one or more features from the given input image to estimate skeletal joint positions of the skeletal joints depicted in the image. For example, the machine learning technique module 512 obtains the given image depicting a user's face, arms, torso, hips and legs. The machine learning technique module 512 extracts features from the image that correspond to the user's face and arms to identify one or more skeletal joints (e.g., the joints shown in FIG. 5B including the left/right wrist joints, left/right elbow joints, left/right shoulder joints, and a nose position).

The machine learning technique module 512 determines the relative positions of the identified skeletal joints to determine a pose that corresponds to the skeletal joint positions.

In some embodiments, a second machine learning technique module 512 extracts one or more features from the given input video to predict skeletal joint positions for a frame subsequent to the last frame of the video. The second machine learning technique module 512 extracts features from the video that correspond to the user's face and arms to predict one or more skeletal joints in a frame that is subsequent to the last frame of the video (e.g., the joints shown in FIG. 5B including the left/right wrist joints, left/right elbow joints, left/right shoulder joints, and a nose position). The second machine learning technique module 512 predicts skeletal joint positions for one or more subsequent frames that follow the given input video. The second machine learning technique module 512 can receive a current video frame and/or skeletal joint positions determined from that current video frame. The second machine learning technique module 512 can process a set of previous frames that depict movement of the body together with image features of a current frame and predict estimated skeletal joint positions for a next frame. Based on the prediction, the second machine learning technique module 512 compares the predicted estimated skeletal joint positions with the skeletal joint positions determined for the current frame by a first machine learning technique module 512. The second machine learning technique module 512 can then determine any deviation and correction needed based on the comparison.

The extracted features of the machine learning technique module 512 are provided to the skeletal joint position module 514. The skeletal joint position module 514 analyzes the skeletal joint features to determine coordinates of specific skeletal joints. For example, the skeletal joint position module 514 determines the x,y coordinates of a particular point of each skeletal joint, such as the x,y coordinates of the left wrist, the x,y coordinates of the left elbow, the x,y coordinates of the left shoulder, the x,y coordinates of the nose (or other facial feature such as mouth, ears or eyes), the x,y coordinates of the right wrist, the x,y coordinates of the right elbow, and the x,y coordinates of the right shoulder.

Pose validation module 516 determines whether a pose corresponding to the detected skeletal joint positions matches a target pose in one or more masks. The pose validation module 516 connects the joint positions with a line to generate an outline texture of the body depicted in the image. The outline texture records or stores the raster representation of the pose versus the background. In some cases, the pose validation module 516 draws the outline of the body texture in a first color (e.g., grey).

Figure 7:
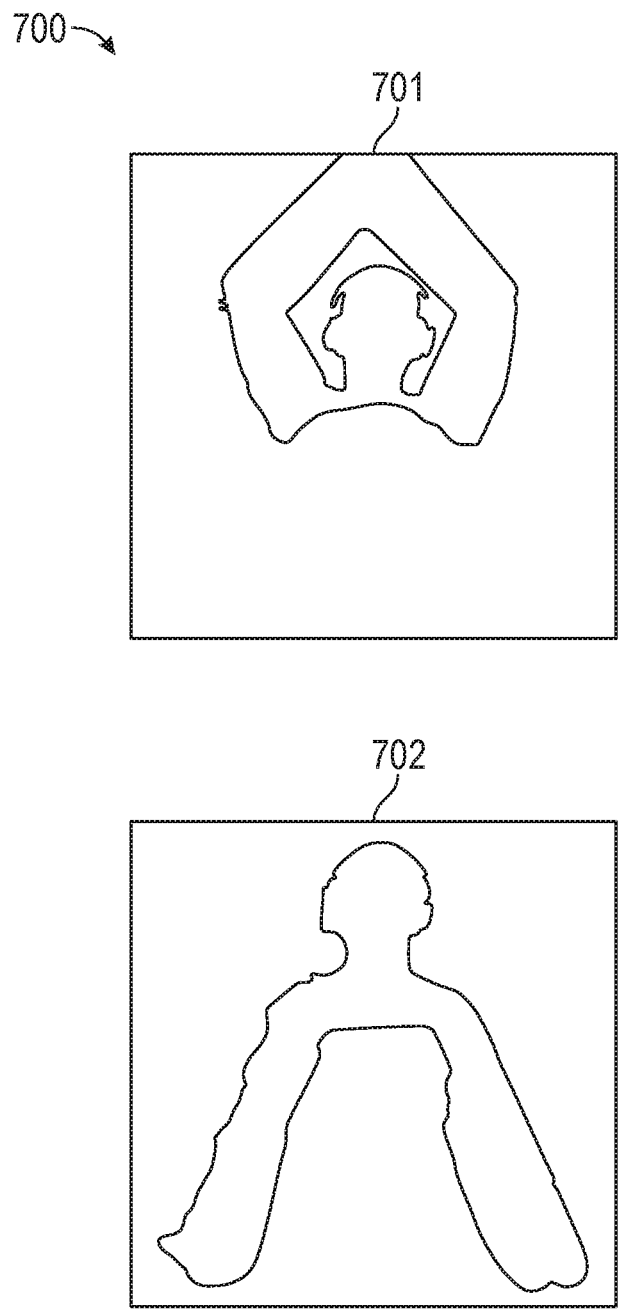
FIG. 7 shows illustrative body pose masks, according to example embodiments.

The pose validation module 516 retrieves one or more masks from target pose mask(s) 309. In some cases, the user selects an operation or function of the AR/VR application via a user interface of the AR/VR application. The application or function may be selected by tapping an option to compute the number of jumping jacks a user performs. In response, the AR/VR application identifies a sequence of masks associated with the selected function or operation that are stored in target pose mask(s) 309. For example, the AR/VR application determines that two masks representing two different target poses are associated with the selected function or operation. FIG. 7 shows illustrative body pose masks 700, according to example embodiments. Specifically, the selected operation or function may be associated with a first mask 701 that depicts a first target pose and a second mask 702 that depicts a second target pose. The first mask 701 may include a set of white pixels representing a first target pose in which the head is in the center and the two arms are raised above the head. The second mask 702 may include a set of white pixels representing a second target pose in which the head is in the center and the arms are lowered all the way down by the waist to a neutral position. The target pose depicted in the masks that are retrieved is marked with a second color (e.g., blue).

In some implementations, the pose validation module 516 computes a distance between predetermined pairs of joints (e.g., a neck and head or two shoulder joints). Based on the distance, the pose validation module 516 selects or adjusts a scale for one or more masks that are retrieved.

The pose validation module 516 align one or more of the retrieved masks with the outline texture of the body of the user. For example, the pose validation module 516 identifies the center of the mask by identifying a position of the head in the mask and aligns the mask based on a position of the head joint position. Namely, the pose validation module 516 overlays the mask such that the head position in the mask substantially aligns with the head joint position. The pose validation module 516 changes the color of the mask pixels that are overlaid by the outline texture from the second color to a third color (e.g., from blue to red). Next, the pose validation module 516 computes how many pixels of the outline texture that is generated overlap with the region of the mask that includes pixels that represent the pose. For example, the pose validation module 516 counts how many pixels of the outline texture overlap the white pixels of the mask by counting how many pixels in the third color (e.g., red color) are detected as matching or un-matching. Namely, the pose validation module 516 counts how many pixels between the current frame mask and the target mask match and un-match. In response to determining that more than an associated threshold percentage of the pixels overlap between the outline texture and the mask, the pose validation module 516 validates or determines that the pose of the body of the user matches the target pose of the mask.

The pose validation module 516 determines whether a second mask is associated with the operation or function. For example, the pose validation module 516 determines whether the operation or function is associated with a sequence of masks or poses. In response, the pose validation module 516 retrieves the second mask in the sequence of masks. The pose validation module 516 analyzes an outline texture generated based on joint positions detected in a second image or set of images against the pose represented by the second mask. When the pose validation module 516 determines that a threshold percentage or amount of pixels of the outline texture overlap with the pose depicted in the second mask, the pose validation module 516 validates or determines that the pose of the body of the user in the second image or set of images matches the target pose of the second mask. Once the pose validation module 516 determines that the sequence or combination of poses depicted by the sequence or combination of masks has been detected in the received or captured image(s), the pose validation module 516 causes the function or operation of the AR/R application to be performed.

The virtual object modification module 518 can adjust a skeletal rig of a given avatar based on the pose received from the pose validation module 516. The virtual object modification module 518 adjusts the way in which the avatar is presented in an image, such as by changing the pose, a visual attribute and/or a position of the avatar in the image. The adjusted avatar is provided by the virtual object modification module 518 to the virtual object display module 520. In some embodiments, the virtual object display module 520 combines the adjusted avatar into the received monocular image depicting the user's body so that both the adjusted avatar and the user are simultaneously presented in an image. The image is provided by the virtual object display module 520 to the client device 102 and can then be sent to another user or stored for later access and display. In some embodiments, virtual object display module 520 executes a function of the AR/VR application, such as updating a count representing the number of times a pose or a sequence of poses are detected based on the pose received from the pose validation module 516. For example, virtual object display module 520 may present a running total of the number of times a user performed actions or poses corresponding to jumping jacks. Specifically, each time the user raises their arms above their head followed by lowering the arms all the way down, the virtual object display module 520 increments a counter that is displayed to indicate the number of jumping jacks the user performed.

Figure 6:
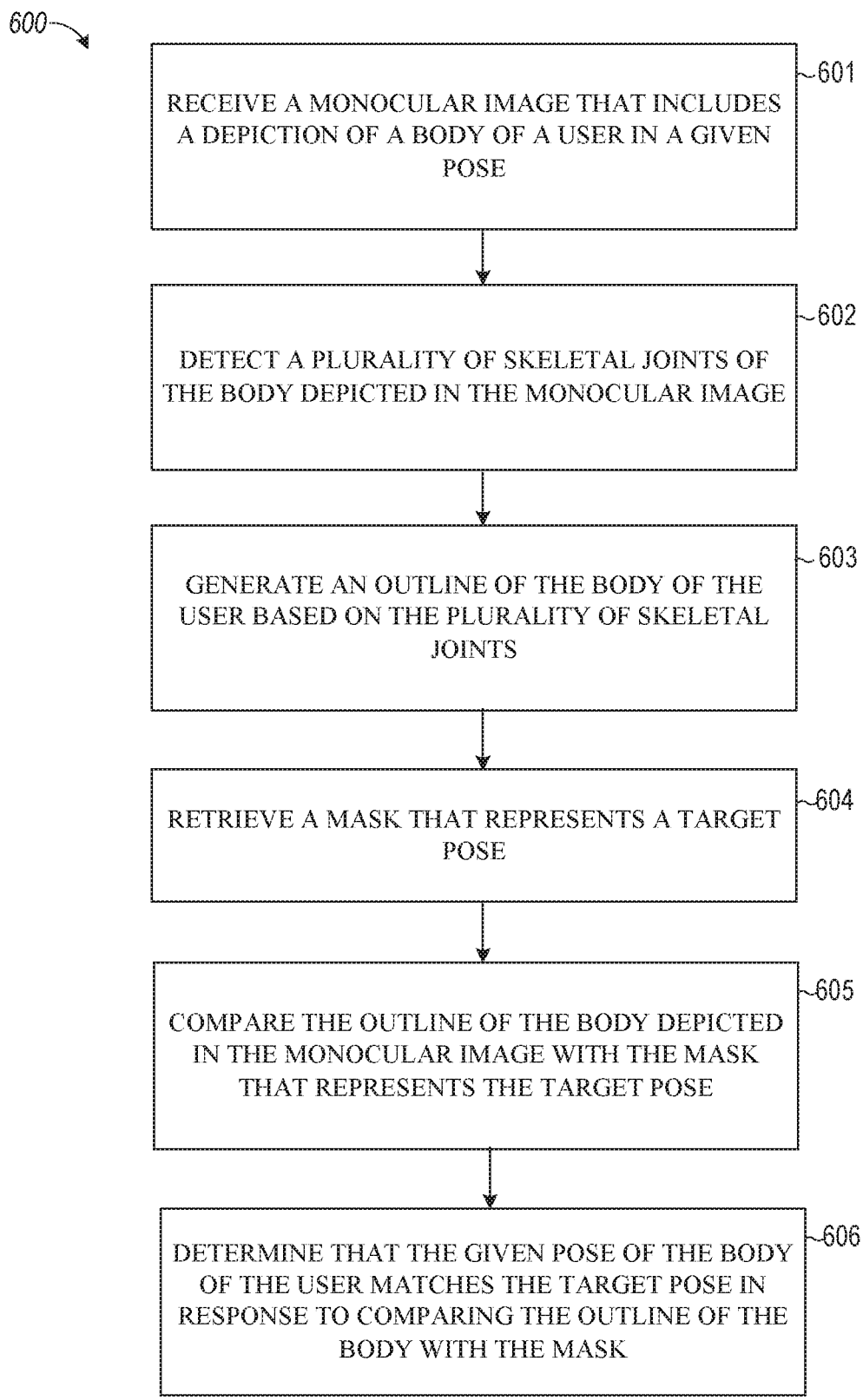
FIG. 6 is a flowchart illustrating example operations of the body pose validation system, according to example embodiments.

FIG. 6 is a flowchart illustrating example operations of the body pose validation system 126 in performing process 600, according to example embodiments. The process 600 may be embodied in computer-readable instructions for execution by one or more processors such that the operations of the process 600 may be performed in part or in whole by the functional components of the messaging server system 108 and/or AR/VR application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the body pose validation system 126 receives a monocular image that includes a depiction of a body of a user in a given pose. For example, the machine learning technique module 512 receives the monocular image 501 depicting a body of a user. The machine learning technique module 512 extracts one or more features from the image indicating skeletal joints.

At operation 602, the body pose validation system 126 detects a plurality of skeletal joints of the body depicted in the monocular image 501. For example, the skeletal joint position module 514 processes the features extracted by the machine learning technique module 512 to determine positions of a set of skeletal joints. The positions may be determined with respect to neutral positions of each skeletal joint (shown in FIG. 5B).

At operation 603, the body pose validation system 126 generates an outline texture of the body of the user based on the plurality of skeletal joints. For example, pose validation module 516 draws a line that connects the plurality of skeletal joint positions.

At operation 604, the body pose validation system 126 retrieves a mask that represents a target pose. For example, the body pose validation system 126 retrieves one or more masks based on a target function of the AR/VR application. The masks depict a given pose or combination or sequence of poses, such as using black and white pixels, where the white pixels correspond to the target pose.

At operation 605, the body pose validation system 126 compares the outline texture of the body depicted in the monocular image with the mask that represents the target pose. For example, the body pose validation system 126 overlays the outline texture of the body with the mask after aligning the outline texture of the body with the mask. The body pose validation system 126 identifies pixels of the outline texture of the body that overlap or overlay the portion of the mask that depicts a target pose. The body pose validation system 126 counts how many pixels of the outline texture overlap or overlay the portion of the mask that depicts the target pose.

At operation 606, the body pose validation system 126 determines that the given pose of the body of the user matches the target pose in response to comparing the outline texture of the body with the mask. For example, the body pose validation system 126 retrieves a threshold and determines whether the number of pixels of the outline texture of the body that overlap or overlay the portion of the mask that depicts the target pose exceeds the threshold. In such cases, the body pose validation system 126 executes a function or operation of the AR/VR application corresponding to the target pose. In some embodiments, the body pose validation system 126 retrieves a second target pose in a sequence of target poses and only executes the function or operation after determining that a second set of images include a depiction of the body of the user in a second target pose after having determined that an initial set of images include the depiction of the body in the first target pose.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 8:
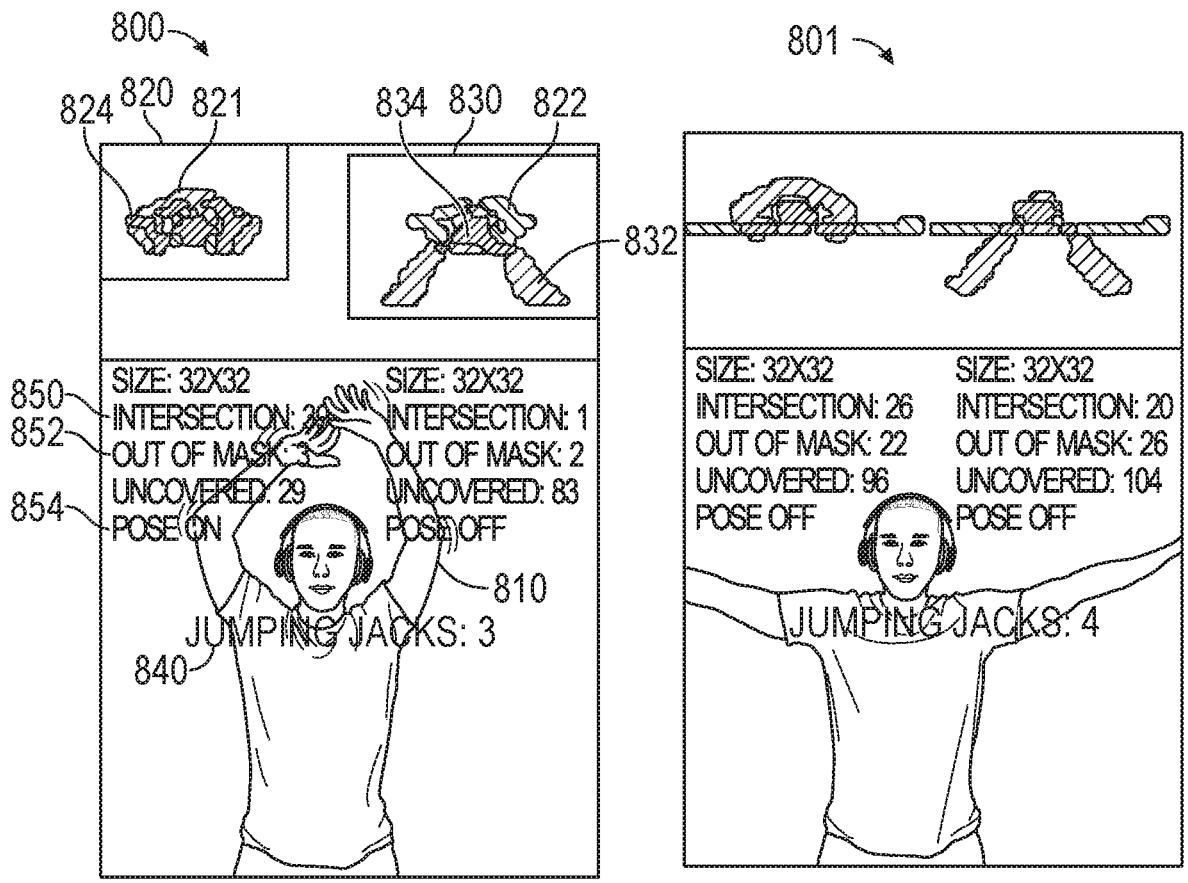
FIG. 8 shows illustrative inputs and outputs of the body pose validation system, according to example embodiments.

FIG. 8 shows illustrative inputs and outputs of the body pose validation system, according to example embodiments. For example, a user of the client device 102 may select an option to count jumping jacks. Specifically, the client device 102 may present a UI of an AR/VR application with a plurality of options for executing functions associated with different body poses. The user can select an option from the plurality to count jumping jacks. In response, first and second masks (shown in FIG. 7) are retrieved to compare against outline textures of the user to determine when the sequence of the poses depicted in the masks match the outlines of the user in the captured images. Some or all of the indicators shown and described in connection with FIG. 8 can be omitted and are shown for illustrative purposes. Namely, only the image of the user in the 810 may be presented together with the running counter 840. All other portions that are shown in FIG. 8 can be omitted and used in the background by the system to count the jumping jacks to update the running counter 840.

As an example, a first user interface 800 is presented to the user. The first user interface 800 depicts a video 810 of a user performing different poses. The first user interface 800 includes an indicator of the function of the AR/VR application that is being executed. In this example, the function is to compute jumping jacks, and the indicator includes the current number of jumping jacks that are detected. The first user interface 800 includes a first portion 820 that identifies a first target pose and a second portion 830 that identifies a second target pose associated with the function being executed. As the video is captured, images are processed to detect joint positions of the user and to draw an outline by connecting the joint positions. An outline of the current skeletal joint positions is represented by a first indicator 822 (e.g., a grey color). A second indicator 832 (e.g., a blue color) identifies the target pose. The outline is continuously updated in real-time as the user moves around in the video and changes their body position. When the first indicator 822 does not overlap any portion of the second indicator 832, each maintains their respective color. The body pose validation system 126 aligns the mask with the outline of the user's body using a reference (e.g., the user's head 834). As shown in the first user interface 800, the portion of the mask corresponding to the head 834 is indicated as being aligned with the user's head joint via an indicator (e.g., a red color).

Initially, the body pose validation system 126 selects the first mask corresponding to a first target pose represented in the first portion 820 to compare against the outline of the user's body. Specifically, the first mask may be positioned first in the sequence of poses corresponding to the selected application function. As such, any pose performed by the user that does not match up with the first target pose corresponding to the first mask is not validated even if such a pose matches a second target pose corresponding to a second mask in the sequence of poses. The body pose validation system 126 determines that the indicator 821 representing the first pose in the first mask is overlapped by the outline of the skeletal joint positions of the current body position. In response, the body pose validation system 126 displays a third indicator 824 (e.g., a red color) that represents the region of the first pose that is overlapped by the outline texture. The body pose validation system 126 computes how many pixels out of the mask are intersected by the outline texture and presents that information in region 850. The body pose validation system 126 computes how many pixels of the mask are uncovered or are out of the mask and presents that information in region 852. The body pose validation system 126 computes how much percentage of the mask is covered or overlapped by the outline. The body pose validation system 126 compares that percentage to a threshold associated with the first mask. In response to determining that the percentage exceeds the threshold, the body pose validation system 126 validates that the current body pose position in the received image or video matches the first target pose. In such cases, the body pose validation system 126 indicates via indicator 854 that the first target pose is detected.

In response to validating that the body pose matches the first target pose, the body pose validation system 126 retrieves the second target pose corresponding to the second mask in the sequence. The body pose validation system 126 determines that the body pose represented by the indicator 822 does not match the second target pose represented by indicator 832. In such cases, the body pose validation system 126 indicates via indicator 854 that the second target pose is not detected. The body pose validation system 126 receives a set of images after the first target pose is detected which represent the user in another target pose as shown in the second user interface 801. In these images, the outline texture of the body shows the user's arms extended and not matching the second target pose or the first target pose. In this situation, the body pose validation system 126 indicates that both the first target pose and the second target pose are not detected.

Once the arms are lowered and the outline position is updated to overlap with the second target pose corresponding to the second mask by a predetermined threshold amount, the body pose validation system 126 detects or validates that the body pose matches the second target pose in the sequence. In response, the body pose validation system 126 updates the indicator 854 to indicate that the second target pose is detected. In response to determining that the target pose sequence does not include any additional target poses (e.g., all of the target poses in the sequence have been detected in the input images in the corresponding sequence), the body pose validation system 126 executes a function of the AR/VR application. For example, the body pose validation system 126 updates or increments a running counter 840 of the sequence of the target poses.

Machine Architecture

Figure 9:
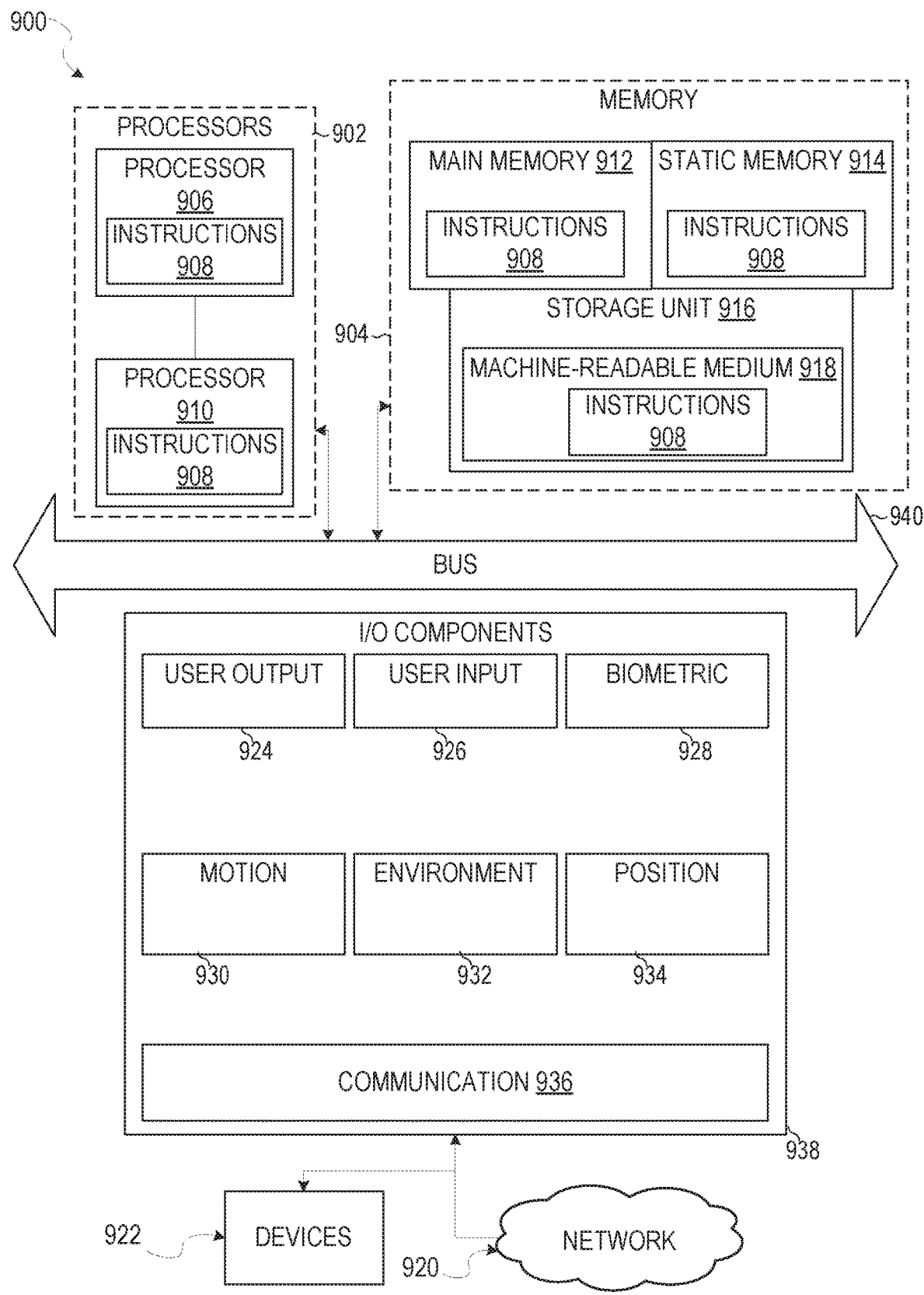
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output I/O components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 940. The main memory 912, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
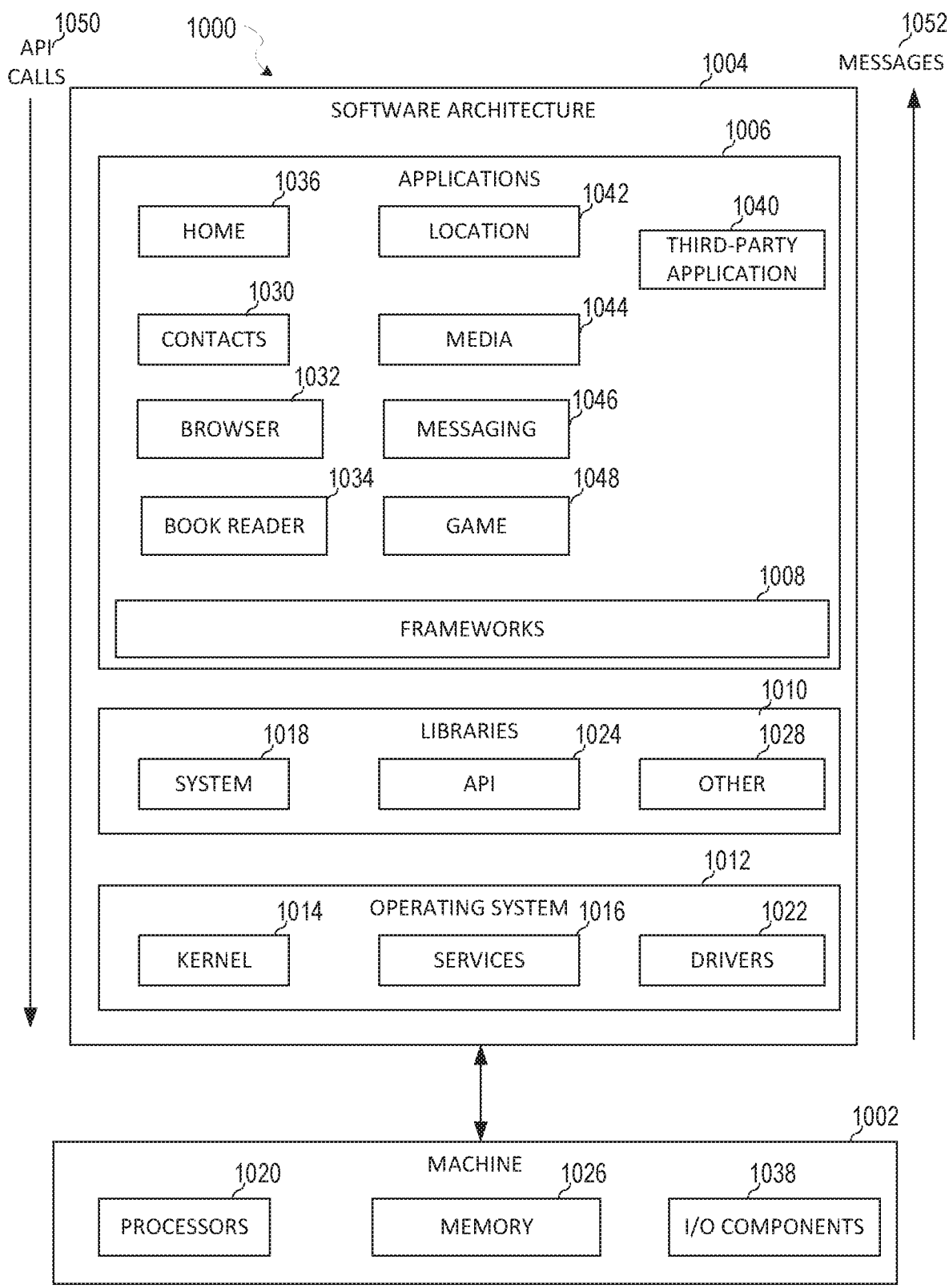
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by one or more processors, a monocular image that includes a depiction of a body of a user in a given pose;
   detecting, by the one or more processors, a plurality of skeletal joints of the body depicted in the monocular image;
   generating an outline of the body of the user based on the plurality of skeletal joints by drawing a line connecting the plurality of skeletal joints;
   retrieving a mask that represents a target pose, the mask being associated with validation criteria comprising a first threshold percentage of overlap of the given pose with a first portion of the mask and a second threshold percentage of overlap of the given pose with a second portion of the mask, the first threshold percentage being different from second threshold percentage such that each of the first and second portions of the mask is associated with a different validation criterion; and
   determining that the given pose of the body of the user matches the target pose by:
     computing a first percentage of the first portion of the mask that is overlapped by a first set of pixels of a first portion of the outline of the body corresponding to a first portion of the line connecting the plurality of skeletal joints;
     computing a second percentage of the second portion of the mask that is overlapped by a second set of pixels of a second portion of the outline of the body corresponding to a second portion of the line connecting the plurality of skeletal joints; and
     determining that the validation criteria is satisfied by determining that the first percentage of the first portion of the mask, that is overlapped by the first set of pixels of the first portion of the outline of the body, corresponds to the first threshold percentage and that the second percentage of the second portion of the mask, that is overlapped by the second set of pixels of the second portion of the outline of the body, corresponds to the second threshold percentage without obtaining a depth map of the body of the user depicted in the monocular image from a depth sensor.

2. The method of claim 1, further comprising:
   receiving a plurality of images from an image capture device;
   detecting presence of the user in the plurality of images; and
   in response to detecting presence of the user, initiating a process for determining that a pose of the user matches the target pose.

3. The method of claim 1, further comprising determining that the given pose of the body of the user matches the target pose in response to determining that the validation criteria is satisfied.

4. The method of claim 1, further comprising:
   computing a number of pixels of the line connecting the plurality of skeletal joints that fall within the target pose in the mask.

5. The method of claim 1, wherein the mask is a first mask and the validation criteria comprises a first validation criteria, further comprising:
   accessing a second mask associated with a second validation criteria; and
   determining that a second pose of the body of the user matches a second target pose by determining that the second validation criteria is satisfied.

6. The method of claim 1, wherein detecting the plurality of skeletal joints of the body comprises identifying points respectively associated with a right wrist, a right elbow, a right shoulder, a nose on a face of the user, a left shoulder, a left elbow, and a left wrist.

7. The method of claim 1, further comprising:
   applying a black and white mask to the monocular image prior to detecting the plurality of skeletal joints.

8. The method of claim 1, wherein the mask includes a black portion and a white portion, wherein the white portion represents an outline corresponding to the target pose, and further comprising comparing the outline of the body depicted in the monocular image with the white portion of the mask.

9. The method of claim 1, further comprising generating an image that combines the mask with the outline, wherein the image includes a first visual indicator of the outline, a second visual indicator of the target pose, and a third visual indicator of a portion of the outline that is within a region of the target pose.

10. The method of claim 1, wherein the target pose comprises a sequence of two or more poses, wherein the mask is a first mask corresponding to a first pose of the two or more poses, wherein the monocular image comprises a first monocular image and the outline comprises a first outline, and wherein the given pose of the user is a first pose, further comprising:
    determining that the first pose of the body of the user matches the first pose of the two or more poses in response to comparing the first outline with the first mask;
    receiving a second monocular image that includes a depiction of a second pose of the body of the user;
    generating a second outline of the body of the user based on a plurality of skeletal joints detected based on the second monocular image;
    retrieving a second mask that represents a second pose of the two or more poses;
    comparing the second outline of the body depicted in the second monocular image with the second mask; and
    determining that the second pose of the body of the user matches the second pose of the two or more poses in response to comparing the second outline of the body with the second mask.

11. The method of claim 10, further comprising accumulating a number representing how many times the first and second poses of the body of the user match the sequence of the two or more poses.

12. The method of claim 11, further comprising:
    receiving a video comprising a first portion and a second portion, wherein the first portion includes a first sequence of monocular images comprising the first and second monocular images, and wherein the second portion includes a second sequence of monocular images, the second sequence of monocular images comprising sets of monocular images depicting the body of the user in the first and second poses; and
    incrementing the number representing how many times the first and second poses of the body of the user match the sequence of the two or more poses each time a portion of the video is determined to include a sequence of monocular images that depict the body of the user in the first and second poses.

13. The method of claim 1, further comprising incrementing a number representing how many times first and second poses of the body of the user match a sequence of two or more poses each time a portion of a video is determined to include a sequence of monocular images comprising the monocular image that depict the body of the user in the first and second poses.

14. The method of claim 1, further comprising adjusting a size of the mask based on skeletal tracking of the plurality of skeletal joints.

15. The method of claim 14, wherein the size of the mask is adjusted based on a computed distance between predetermined pairs of the plurality of skeletal joints.

16. The method of claim 1, further comprising:
    receiving a video comprising a first portion and a second portion, wherein the first portion includes a first sequence of monocular images comprising, and wherein the second portion includes a second sequence of monocular images, each of the first and second sequences of monocular images comprising respective sets of monocular images depicting the body of the user in first and second poses; and
    incrementing a number representing how many times the first and second poses of the body of the user match a sequence of two or more poses each time a portion of the video is determined to include a sequence of monocular images that depict the body of the user in the first and second poses.

17. The method of claim 1, further comprising:
    scaling the depiction of the body of the user in the monocular image; and
    selecting a size for the mask based on the scaled depiction of the body.

18. A system comprising:
    a processor configured to perform operations comprising:
    receiving a monocular image that includes a depiction of a body of a user in a given pose;
    detecting a plurality of skeletal joints of the body depicted in the monocular image;
    generating an outline of the body of the user based on the plurality of skeletal joints by drawing a line connecting the plurality of skeletal joints;
    retrieving a mask that represents a target pose, the mask being associated with validation criteria comprising a first threshold percentage of overlap of the given pose with a first portion of the mask and a second threshold percentage of overlap of the given pose with a second portion of the mask, the first threshold percentage being different from second threshold percentage such that each of the first and second portions of the mask is associated with a different validation criterion; and
    determining that the given pose of the body of the user matches the target pose by:
        computing a first percentage of the first portion of the mask that is overlapped by a first set of pixels of a first portion of the outline of the body corresponding to a first portion of the line connecting the plurality of skeletal joints;
        computing a second percentage of the second portion of the mask that is overlapped by a second set of pixels of a second portion of the outline of the body corresponding to a second portion of the line connecting the plurality of skeletal joints; and
        determining that the validation criteria is satisfied by determining that the first percentage of the first portion of the mask, that is overlapped by the first set of pixels of the first portion of the outline of the body, corresponds to the first threshold percentage and that the second percentage of the second portion of the mask, that is overlapped by the second set of pixels of the second portion of the outline of the body, corresponds to the second threshold percentage without obtaining a depth map of the body of the user depicted in the monocular image from a depth sensor.

19. The system of claim 18, wherein the operations comprise:
    scaling the depiction of the body of the user in the monocular image; and
    selecting a size for the mask based on the scaled depiction of the body.

20. A non-transitory machine-readable storage medium that includes instructions that, when executed by one or more processors of a machine, cause the machine to perform operations comprising:
    receiving a monocular image that includes a depiction of a body of a user in a given pose;
    detecting a plurality of skeletal joints of the body depicted in the monocular image;

generating an outline of the body of the user based on the plurality of skeletal joints by drawing a line connecting the plurality of skeletal joints;

retrieving a mask that represents a target pose, the mask being associated with validation criteria comprising a first threshold percentage of overlap of the given pose with a first portion of the mask and a second threshold percentage of overlap of the given pose with a second portion of the mask, the first threshold percentage being different from second threshold percentage such that each of the first and second portions of the mask is associated with a different validation criterion; and determining that the given pose of the body of the user matches the target pose by:

computing a first percentage of the first portion of the mask that is overlapped by a first set of pixels of a first portion of the outline of the body corresponding to a first portion of the line connecting the plurality of skeletal joints;

computing a second percentage of the second portion of the mask that is overlapped by a second set of pixels of a second portion of the outline of the body corresponding to a second portion of the line connecting the plurality of skeletal joints; and determining that the validation criteria is satisfied by determining that the first percentage of the first portion of the mask, that is overlapped by the first set of pixels of the first portion of the outline of the body, corresponds to the first threshold percentage and that the second percentage of the second portion of the mask, that is overlapped by the second set of pixels of the second portion of the outline of the body, corresponds to the second threshold percentage without obtaining a depth map of the body of the user depicted in the monocular image from a depth sensor.

* * * * *